US008595070B1

(12) United States Patent  
Barnes et al.

(10) Patent No.: US 8,595,070 B1  
(45) Date of Patent: Nov. 26, 2013

(54) COUPON VALIDATION USING RADIO FREQUENCY FINGERPRINTING

(75) Inventors: James D. Barnes, Overland Park, KS (US); Peter H. Distler, Overland Park, KS (US); Michael P. McMullen, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1565 days.

(21) Appl. No.: 11/779,045

(22) Filed: Jul. 17, 2007

(51) Int. Cl.  
*G06Q 30/00* (2012.01)

(52) U.S. Cl.  
USPC ............ 705/14.64; 705/14.38; 705/14.1; 705/14.58; 705/14.65; 705/14.75; 455/465

(58) Field of Classification Search  
USPC ........... 705/10, 26, 14.1, 14.38, 14.64, 14.58, 705/75, 14.65; 455/456, 466  
See application file for complete search history.

(56) References Cited

U.S. PATENT DOCUMENTS

| | | | | |
|---|---|---|---|---|
| 6,011,487 | A * | 1/2000 | Plocher | 340/8.1 |
| 6,249,252 | B1 | 6/2001 | Dupray | |
| 6,332,127 | B1 * | 12/2001 | Bandera et al. | 705/14.55 |
| 6,405,044 | B1 * | 6/2002 | Smith et al. | 455/447 |
| 6,449,486 | B1 | 9/2002 | Rao | |
| 6,505,046 | B1 * | 1/2003 | Baker | 455/456.3 |
| 6,760,582 | B2 | 7/2004 | Gaal | |
| 6,801,778 | B2 | 10/2004 | Koorapaty et al. | |
| 6,961,367 | B2 | 11/2005 | Simic et al. | |
| 7,057,557 | B2 | 6/2006 | Lee | |
| 7,092,722 | B1 | 8/2006 | Oh et al. | |
| 7,236,879 | B2 | 6/2007 | Tsunehara et al. | |
| 7,242,950 | B2 | 7/2007 | Suryanarayana et al. | |
| 7,257,392 | B2 * | 8/2007 | Tang et al. | 455/414.2 |
| 7,308,254 | B1 * | 12/2007 | Rissanen | 455/414.1 |
| 7,336,942 | B2 * | 2/2008 | Wang | 455/404.2 |
| 7,343,317 | B2 * | 3/2008 | Jokinen et al. | 705/14.64 |
| 7,376,430 | B2 | 5/2008 | Matsuda | |
| 7,400,884 | B2 | 7/2008 | Fok et al. | |
| 7,945,271 | B1 | 5/2011 | Barnes et al. | |
| 8,010,134 | B2 | 8/2011 | Barnes et al. | |
| 8,180,371 | B1 | 5/2012 | Izdepski et al. | |
| 8,369,871 | B1 | 2/2013 | Izdepski et al. | |
| 2002/0086680 | A1 | 7/2002 | Hunzinger | |
| 2002/0095333 | A1 * | 7/2002 | Jokinen et al. | 705/14 |
| 2002/0167444 | A1 | 11/2002 | Lee | |

(Continued)

FOREIGN PATENT DOCUMENTS

WO 2008112401 A1 9/2008  
WO WO2008112401 A1 * 9/2008

OTHER PUBLICATIONS

Final Office Action dated May 11, 2010, U.S. Appl. No. 11/686,179, filed Mar. 14, 2007, 23 pages.

(Continued)

*Primary Examiner* — Michael Bekerman  
*Assistant Examiner* — Luis A Brown (57) ABSTRACT

A method is provided for coupon validation. A coupon is downloaded to a mobile device. The mobile device is used to determine a radio frequency fingerprint comprising cell tower data and cell sector data. The coupon is associated with the radio frequency fingerprint. Whether the radio frequency fingerprint matches a radio frequency fingerprint specified for redemption is determined. Redemption of the coupon is enabled in response to a determination that the radio frequency fingerprint matches the radio frequency fingerprint specified for redemption.

23 Claims, 4 Drawing Sheets

(56) References Cited

U.S. PATENT DOCUMENTS

| | | | |
|---|---|---|---|
| 2003/0008668 | A1 | 1/2003 | Perez-Breva et al. |
| 2003/0065805 | A1* | 4/2003 | Barnes, Jr. .................... 709/231 |
| 2004/0140361 | A1* | 7/2004 | Paul et al. ................ 235/462.45 |
| 2004/0162090 | A1 | 8/2004 | Suryanarayana et al. |
| 2004/0198386 | A1 | 10/2004 | Dupray |
| 2004/0243519 | A1* | 12/2004 | Perttila et al. ................... 705/75 |
| 2005/0192024 | A1 | 9/2005 | Sheynblat |
| 2006/0089153 | A1* | 4/2006 | Sheynblat ................. 455/456.1 |
| 2006/0178932 | A1* | 8/2006 | Lang ............................... 705/14 |
| 2007/0161380 | A1 | 7/2007 | Fok et al. |
| 2007/0162341 | A1* | 7/2007 | McConnell et al. ............ 705/14 |
| 2008/0010114 | A1* | 1/2008 | Head ............................... 705/14 |
| 2008/0119206 | A1* | 5/2008 | Shalmon et al. ........... 455/456.3 |
| 2008/0227467 | A1 | 9/2008 | Barnes et al. |
| 2009/0280824 | A1 | 11/2009 | Rautiainen |
| 2009/0292799 | A1 | 11/2009 | Eisener |

OTHER PUBLICATIONS

Barnes, James D., et al., "Location Inference Using Radio Frequency Fingerprinting," U.S. Appl. No. 11/779,900, filed Jul. 19, 2007.

Izdepski, Erich J., et al., et al., "System and Method for Mobile Device Self-Location," U.S. Appl. No. 12/543,451, filed Aug. 18, 2009.

Oh, Dae-Sik, et al., et al., et al., "Mobile-Implemented Method and System for Performing a Handoff Based on Mobile Station Location," U.S. Appl. No. 10/784,612, filed Feb. 23, 2004.

Foreign Communication From a Related Counterpart Application—International Preliminary Report on Patentability, PCT/CN2008/054657, Sep. 24, 2008, 6 pages.

International Searching Authority, International Search Report and the Written Opinion of the International Searching Authority dated Jun. 5, 2008, International Application Serial No. PCT/US08/54657, international filing date Feb. 22, 2008.

Lightningcast, Inc., "Lightningcast Mobile Video Advertising Solution," May 2, 2005, 14 pgs.

Office Action dated Oct. 15, 2009, U.S. Appl. No. 11/686,179, filed Mar. 14, 2007, 19 pages.

Office Action dated Jun. 25, 2010, U.S. Appl. No. 11/779,900, filed Jul. 19, 2007, 22 pages.

Final Office Action dated Aug. 12, 2010, U.S. Appl. No. 11/686,179 filed Mar. 14, 2007, 23 pages.

Final Office Action dated Dec. 7, 2010, U.S. Appl. No. 11/686,179, filed Mar. 14, 2007.

Notice of Allowance dated Dec. 10, 2010, U.S. Appl. No. 11/779,900, filed Jul. 19, 2007.

Advisory Action dated Feb. 16, 2011, U.S. Appl. No. 11/686,179, filed Mar. 14, 2007.

Supplemental Notice of Allowance dated Feb. 17, 2011; U.S. Appl. No. 11/779,900, filed Jul. 19, 2007.

Pre-Interview Communication dated Nov. 15, 2011, U.S. Appl. No. 12/543,451, filed Aug. 18, 2009.

Notice of Allowance dated Jan. 12, 2012, U.S. Appl. No. 12/543,451, filed Aug. 18, 2009.

Izdepski, Erich J., et al., et al., "System and Method for Mobile Device Self-Location," U.S. Appl. No. 13/439,593, filed Apr. 4, 2012.

Notice of Allowance dated Sep. 20, 2012, U.S. Appl. No. 12/439,593, filed Apr. 4, 2012.

Supplemental Notice of Allowance dated Oct. 9, 2012, U.S. Appl. No. 12/439,593, filed Apr. 4, 2012.

Notice of Allowance dated May 9, 2011, U.S. Appl. No. 11/686,179, filed Mar. 14, 2007.

* cited by examiner

COUPON VALIDATION USING RADIO FREQUENCY FINGERPRINTING

CROSS-REFERENCE TO RELATED APPLICATIONS

This application includes subject matter related to the following application, which is hereby incorporated by reference: U.S. patent application Ser. No. 11/686,179, filed Mar. 14, 2007, entitled "Architecture for Mobile Advertising with Location," by James D. Barnes, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In marketing, a coupon is a ticket or document that can be exchanged for a financial discount, rebate, or other value related to goods or services. Customarily, coupons are issued by manufacturers of consumer packaged goods or by retailers, to be used in retail stores as a part of sales promotions. Coupons are often widely distributed through mail, magazines, newspapers and computer networks. Coupons distributed via computer networks have become popular because there is no postal cost and any printing cost is borne by the user, who may print the coupons, rather than the businesses issuing them.

Online retailers often refer to their coupons as "coupon codes," "promotional codes," "promotion codes," "discount codes," "key codes," "promo codes," "shopping codes," "voucher codes" or "source codes." Such electronic coupons typically provide for reduced cost or free shipping, a specific dollar or percentage discount, or some other offer to encourage consumers to purchase specific products or to purchase from specific retailers.

However, the popularity of electronic coupons has given rise to various problems. An electronic coupon that is submitted for redemption may be fraudulent and the business redeeming the coupon may not have issued the coupon. Because some retail stores in a national business may redeem only some of the business' electronic coupons, the selective retail stores need to be able to determine how an electronic coupon was issued before deciding whether to redeem the electronic coupon. Furthermore, businesses that issue electronic coupons need to verify that electronic coupons being submitted to a clearing house for redemption are actually being redeemed at a valid retail store for the business.

SUMMARY

In some embodiments, a method is provided for coupon validation. A coupon is downloaded to a mobile device. The mobile device is used to determine a radio frequency fingerprint comprising cell tower data and cell sector data. The coupon is associated with the radio frequency fingerprint. Whether the radio frequency fingerprint matches a radio frequency fingerprint specified for redemption is determined. Redemption of the coupon is enabled in response to a determination that the radio frequency fingerprint matches the radio frequency fingerprint specified for redemption.

In other embodiments, a system is provided for coupon validation. The system includes a mobile device and a location engine on the mobile device. The mobile device downloads a coupon. The location engine determines a radio frequency fingerprint comprising cell tower data and cell sector data, and associates the coupon with the radio frequency fingerprint. The mobile device determines whether the radio frequency fingerprint matches a radio frequency fingerprint specified for redemption and promotes redemption of the coupon in response to a determination that the radio frequency fingerprint matches the radio frequency fingerprint specified for redemption.

In still other embodiments, a method is provided for coupon validation. A coupon is downloaded to a first mobile device. The first mobile device is used to determine a radio frequency fingerprint comprising cell tower data and cell sector data. The coupon is associated with the radio frequency fingerprint. The coupon is transferred to a second mobile device. Whether the radio frequency fingerprint matches a radio frequency fingerprint specified for redemption is determined. Redemption of the coupon is enabled in response to a determination that the radio frequency fingerprint matches the radio frequency fingerprint specified for redemption.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for coupon validation using radio frequency fingerprints. A mobile device downloads a coupon. The mobile device does not determine its location using an intensive technology such as triangulation, which unnecessarily drains the battery of the mobile device and consumes significant network time and resources. Instead, the mobile device determines a radio frequency fingerprint, which identifies signals received from nearby cell towers and cell sectors. The mobile device associates the radio frequency fingerprint with the downloaded coupon. The mobile device can use the radio frequency fingerprint associated with the coupon to subsequently validate the coupon.

When the coupon is presented for redemption, the mobile device determines whether the radio frequency fingerprint associated with the coupon matches any radio frequency fingerprint specified for redemption by the business that issued the coupon. The mobile device may have determined the radio frequency fingerprint associated with the coupon to enable receipt of the coupon at a specified location. Alternatively, the mobile device may have determined the radio frequency fingerprint associated with the coupon after receipt of the coupon to record the receipt location, a location that is subsequently used for matching at the time of redemption. Because the business can track the geographic locations and the corresponding radio frequency fingerprints where its coupons were issued, the business can verify that coupons the business is requested to redeem are coupons that the business actually issued. If the radio frequency fingerprint associated with the coupon matches any radio frequency fingerprint that is specified for redemption, then the location of the mobile device when the coupon was downloaded is likely the same location that is specified for redemption, or at least a known and acceptable location. This matching significantly reduces the chances that the coupon is fraudulent. If the radio frequency fingerprint associated with the coupon matches the radio frequency fingerprint specified for redemption, the mobile device enables redemption of the coupon. The mobile device may also transfer the coupon to another mobile device, which may redeem the coupon based on the associated radio frequency fingerprint.

Figure 1:
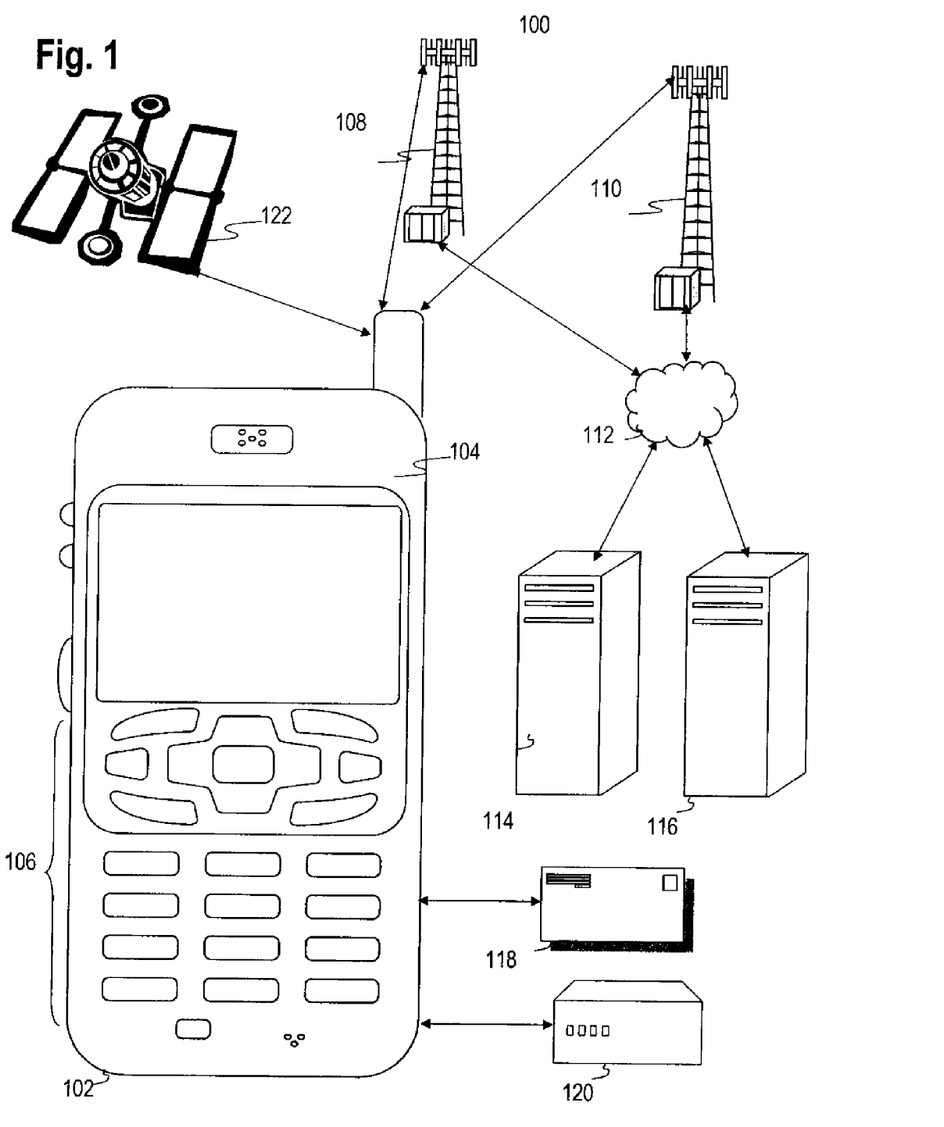
FIG. 1 shows an illustrative wireless communications system for coupon validation using radio frequency fingerprinting.

FIG. 1 shows a wireless communications system 100 that illustrates the context for the systems and methods of the present disclosure. The wireless communication system 100 includes an illustrative mobile device 102. Though illustrated as a mobile phone, the mobile device 102 may take various forms including a personal digital assistant (PDA), a mobile computer, a digital camera, and a digital music player. Many suitable mobile devices combine some or all of these functions.

The mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, including web browsing and viewing of valid coupons.

In the illustrative system 100, the mobile device 102 communicates through either a first cell tower 108 or a second cell tower 110 and through a wired or wireless network 112 to access information on various servers, such as a server 114 and a redemption server 116. While two cell towers are shown in FIG. 1, other cell towers could be present. The server 114 may provide content that may be shown on the display 104. The redemption server 116 can store a coupon 118, a radio frequency fingerprint, a corresponding time for the radio frequency fingerprint, and a unique identifier for the mobile device 102.

The mobile device 102 can determine a radio frequency fingerprint that indicates the location of the mobile device 102. A radio frequency fingerprint is a set of wireless signals, such as cell tower signals and cell sector signals, received by an antenna and front end unit from a wireless communication network and converted to baseband by a radio frequency transceiver. No additional consumption of time or resources is required for the mobile device 102 to determine a radio frequency fingerprint because the mobile device 102 already determines radio frequency fingerprints on a periodic basis to determine if the mobile device 102 will switch from communicating with one cell tower to communicating with another cell tower.

The mobile device 102 can determine a radio frequency fingerprint before it downloads the coupon 118, when it downloads the coupon 118, periodically, or at other times such as a user using the mobile device 102, and a location request, as described below in reference to box 306 in FIG. 3. The mobile device 102 can also store the radio frequency fingerprint for the mobile device 102 on the mobile device 102 and/or on the redemption server 116. Additionally, the mobile device 102 can determine whether the radio frequency fingerprint associated with the coupon 118 matches another radio frequency fingerprint specified for redemption. Furthermore, the mobile device 102 may transfer the coupon 118 and any associated radio frequency fingerprints to other mobile devices.

The coupon 118 can be transmitted to the mobile device 102 by a point of sale device 120, which may be located in a retail store of the business that issued the coupon 118. For example, when the user of the mobile device 102 purchases a book at a book store, the point of sale device 120 at the book store transmits the coupon 118 to the mobile device 102 as an incentive for the user of the mobile device 102 to return to the book store for future purchases. The point of sale device 120 can reference a database listing radio frequency fingerprints specified for redemption, such as the radio frequency fingerprint associated with the point of sale device 120 and other radio frequency fingerprints that are associated with other locations where the business issues coupons. The point of sale device 120 can also get the radio frequency fingerprint from the mobile device 102 for comparative purposes.

The business can also issue the coupon 118 via the network 112. The user of the mobile device 102 can use a web browser on the mobile device 102 to download the coupon 118. If the business that issued the coupon restricts downloading of the coupon to mobile devices at specified locations, the mobile device 102 determines a radio frequency fingerprint and verifies that the radio frequency fingerprint matches the radio frequency fingerprints specified for downloading by the business before downloading the coupon 118.

The radio frequency fingerprint can also include a unique identifier for the mobile device 102 that determined the radio frequency fingerprint. For example, a mobile identification number (MIN) refers to a 10-digit unique number that a wireless operator uses to identify a mobile phone. A business can validate coupons based on the unique identifier included in the radio frequency fingerprint in addition to or instead of the location inferred by the radio frequency fingerprint. If the business issues the coupon 118 via the network 112 without any location downloading restrictions, the user of the mobile device 102 can use a web browser on the mobile device 102 or on a computer to download the coupon 118 and transfer the coupon 118 from the computer to the mobile device 102. The act of transferring the coupon 118 from the computer to the mobile device 102 determines a radio frequency fingerprint that includes the unique identifier for the mobile device 102.

For this example, the business is not concerned whether a preferential customer downloads the coupon 118 on a home computer at an unknown location, but the business wants to limit redemption of the coupon 118 to the mobile device 102 to which the coupon 118 was initially transferred. The business may offer a password-protected webpage that preferential customers can access and use to download coupons. When the coupon 118 is presented for redemption at one of the business' locations, the unique identifier included in the radio frequency fingerprint identifies the mobile device 102 to which the coupon 118 was initially transferred, which is most likely the mobile device 102 used by the preferential customer. If the unique identifier associated with the coupon matches the unique identifier of the mobile device 102 that is presenting the coupon 118 for redemption, the mobile device 102 enables redemption of the coupon 118 because of the strong likelihood that the preferential customer is responsible for presenting the coupon 118 for redemption.

Additionally, the mobile device 102 may communicate with a global positioning satellite 122 to determine the location of the mobile device 102, but such a determination may involve more system overhead and may be less reliable for indoor environments typical at redemption. While one content server and one redemption server are shown in FIG. 1, other servers could be present. The server 114 and the redemption server 116 communicate with the mobile device 102 through the network 112 and either the first cell tower 108 or the second cell tower 110 by a standard wireless telephony protocol (such as code division multiple access), a wireless internet connection, or some other means of wireless communication. Although the server 114 and the redemption server 116 are depicted separately in FIG. 1, the functions of the server 114 and the functions of the redemption server 116 can be combined on one server.

Figure 2:
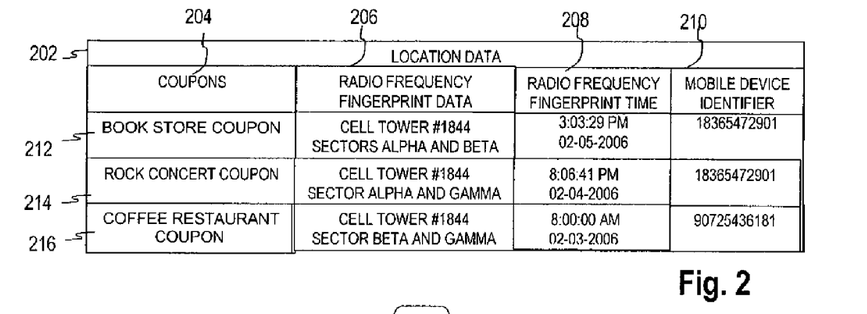
FIG. 2 shows location information for coupon validation using radio frequency fingerprinting according to some embodiments of the present disclosure.

FIG. 2 shows a block diagram of the location data 202 for coupon validation using radio frequency fingerprinting according to some embodiments of the present disclosure. The location data 202 includes a coupons 204 column, a radio frequency fingerprint data 206 column, a radio frequency fingerprint time 208 column, and a mobile device identifier 210 column. The coupons 204 column includes an identifier for each coupon, such as a book store coupon 212, a rock concert coupon 214, and a coffee restaurant coupon 216.

For example, "cell tower #1844 sectors alpha and beta" is listed in the book store coupon 212 row under the radio frequency fingerprint data 206 column. The data shown for the book store coupon 212 indicates that an antenna and front end unit for the mobile device 102 receives information from the first cell tower 108, which can be identified by a cell tower identifier, such as #1844. Most cell towers broadcast using multiple cell sectors, typically three that are labeled alpha, beta, and gamma. Cell sectors are sub-regions of a coverage area for a cell tower, but because cell sectors change dynamically based on usage requirements, cell sectors do not necessarily identify specific geographical locations. Each cell sector signal can include multiple frequencies, such as 10 frequencies per cell sector region. The data for the book store coupon 212 indicates that the antenna and front end unit of the mobile device 102 receives information from the alpha sector and the beta sector for the first cell tower 108, but not from the gamma sector for the first cell tower 108.

The radio frequency fingerprint time 208 column lists "3:03:29 PM on Feb. 5, 2006" as the radio frequency fingerprint time in the book store coupon 212 row. This radio frequency fingerprint time is associated with the radio frequency fingerprint because it indicates the time the radio frequency fingerprint was determined for the book store coupon 212.

The mobile device identifier 210 column lists "18365472901" as the identifier of the mobile device 102 that determined the radio frequency fingerprint in the book store coupon 212 row. This mobile device identifier 210 is associated with the book store coupon 212 because it uniquely identifies the mobile device 102 that determined the radio frequency fingerprint for the book store coupon 212.

Additionally, the data for the coupons can include cell tower signal amplitude, cell tower signal phase, cell sector frequencies, and pseudo noise phase measurement data. The mobile device 102 detects the pseudo noise phase measurement data broadcast by transmitting cell towers. Depending on variables such as processor power, available battery power, accuracy required, and the tolerance for false alarms, the mobile device 102 can detect very small increments of movement by the mobile device 102 by tracking the phase shifts of the pseudo noise phase measurement data.

In the rock concert coupon 214 row, "cell tower #1844 sector alpha and gamma" is listed under the radio frequency fingerprint data 206 column. The data shown for the rock concert coupon 214 indicates that the antenna and front end unit of the mobile device 102 received information from the alpha sector and the gamma sector for the first cell tower 108, but not from the beta sector for the first cell tower 108. The radio frequency fingerprint data for the rock concert coupon 214 is based on the radio frequency fingerprint that was determined for the rock concert coupon 214.

Figure 3:
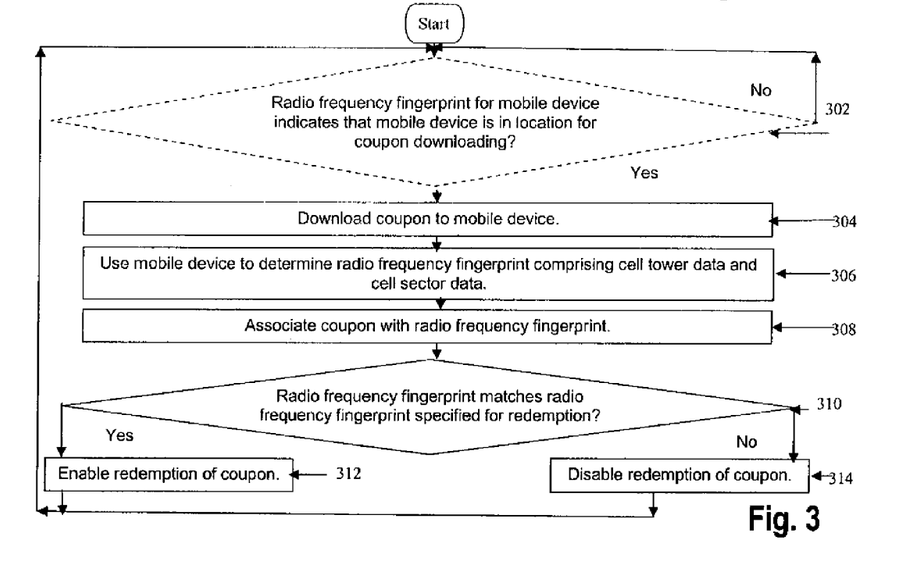
FIG. 3 shows a flowchart of a method for coupon validation using radio frequency fingerprinting according to some embodiments of the present disclosure.

FIG. 3 is a flowchart illustrating a method for coupon validation using radio frequency fingerprinting according to some embodiments of the present disclosure. The mobile device 102 can use the method to determine whether to enable redemption of coupons.

In box 302, the mobile device 102 optionally determines whether a radio frequency fingerprint indicates that the mobile device 102 is in a location for coupon downloading. If the mobile device 102 does not determine whether a radio frequency fingerprint indicates that the mobile device 102 is in a location for coupon downloading, the method continues to box 304. For example, the mobile device 102 determines whether a radio frequency fingerprint indicates that the mobile device 102 is in a book store for downloading the coupon 118 offered by the book store. The book store may offer the coupon 118 via the network 112, but only to mobile devices that are located at the book store. Such a location requirement encourages customers of the book store to come to the book store to be able to download the coupon 118.

Alternatively, the mobile device 102 occasionally determines and stores radio frequency fingerprints. For this example, the mobile device 102 determines whether any of the stored radio frequency fingerprints indicates that the mobile device 102 has been in the book store that is offering to downloading the coupon 118. The book store may encourage potential customers to come to the book store by offering the coupon 118 only to mobile devices that are currently located at the book store or have been previously located at the book store.

If the mobile device 102 determines that the radio frequency fingerprint indicates that the mobile device is in a location for coupon downloading, the method continues to box 304. If the mobile device 102 determines that the radio frequency fingerprint indicates that the mobile device 102 is not in a location for coupon downloading, the method returns to box 302 to wait to check if the mobile device 102 is in a location for coupon downloading.

In box 304, the mobile device 102 downloads the coupon 118. For example, following a purchase of a book at the point of sale device 120, the point of sale device 120 makes the coupon 118 available for downloading. The mobile device 102 downloads the coupon 118 for a discount on a subsequent book purchase from the point of sale device 120 at the book store.

In box 306, the mobile device 102 determines a radio frequency fingerprint, comprising cell tower data and cell sector data. For example, the mobile device 102 determines a radio frequency fingerprint when the mobile device 102 is at the book store. The radio frequency fingerprint determined at the book store includes cell tower data and cell sector data based on the signals that the mobile device 102 receives at the book store.

The book store may redeem the coupon 118 even if the coupon 118 has been transferred from the mobile device 102 that originally downloaded the coupon 118 to another mobile device provided that the radio frequency fingerprint determined by the original mobile device 102 at the time of transfer matches the radio frequency fingerprint specified for redemption. Additionally, the coupon 118 can record how many times it has been transferred from one mobile device to another mobile device, such that the number of transfers can be limited before the coupon 118 becomes invalid.

Additionally, the coupon 118 can limit transfers to mobile devices in specified areas and prohibit or require transfers to mobile devices in other areas. For example, a coffee restaurant can issue a coffee restaurant coupon to mobile devices within the immediate area of the coffee restaurant, as indicated by radio frequency fingerprints. In an effort to insure repeat customers, the coffee restaurant coupon may specify that it can only be redeemed by mobile devices that received the coffee restaurant coupon when inside the immediate area of the coffee restaurant.

Furthermore, a coffee restaurant can issue a coffee restaurant coupon to mobile devices within the immediate area of the coffee restaurant, where the coupon can only be redeemed at other branches affiliated with the coffee restaurant. For example, in an effort to encourage current customers at one branch to visit a newly opened branch, the coffee restaurant coupon may specify that after the coupon is received at the established branch, the coupon can only be redeemed at the newly opened branch.

Alternatively, the coffee restaurant may specify that the coffee restaurant coupon can only be redeemed by mobile devices that received a transfer of the coffee restaurant coupon when outside the immediate area of the coffee restaurant. Downloading this coffee restaurant coupon may encourage mobile device users in the coffee restaurant to transfer the coffee restaurant coupon to family and friends who are not at the coffee restaurant, which may give incentives to the recipients of the transferred coffee restaurant coupon to come to the coffee restaurant.

Moreover, the coffee restaurant coupon may specify that the coffee restaurant coupon can only be redeemed at other branches of the coffee restaurant by mobile devices that received a transfer of the coffee restaurant coupon when outside the immediate area of the coffee restaurant. Downloading this coffee restaurant coupon encourages mobile device users in the coffee restaurant to transfer the coffee restaurant coupon to family and friends who are not at the established coffee restaurant, which may give incentives to the recipients of the transferred coffee restaurant coupon to visit to newly opened branches of the coffee restaurant.

The mobile device 102 can determine a radio frequency fingerprint periodically, such as determining and storing the radio frequency fingerprint once every minute. The mobile device 102 can determine and store a radio frequency fingerprint in the background without requiring significant time or resources for the mobile device 102 and the network 112. If the current radio frequency fingerprint does not indicate a significant change from a most recently stored radio frequency fingerprint, then the mobile device 102 can wait for the same duration of time before determining another radio frequency fingerprint.

However, if the current radio frequency fingerprint indicates a significant change from the most recently stored radio frequency fingerprint, then the mobile device 102 can wait for a shorter duration of time before determining another radio frequency fingerprint. Similarly, if repeatedly the current radio frequency fingerprint does not indicate a significant change from the most recently stored radio frequency fingerprint, then the mobile device 102 can wait for a longer duration of time before determining another radio frequency fingerprint.

A significant change from the previous radio frequency fingerprint can indicate that the mobile device 102 is in a different location from the location where the most recently stored radio frequency fingerprint was determined. The absence of a significant change from the previous radio frequency fingerprint can indicate that the mobile device 102 is in the same location as the location where the most recently stored radio frequency fingerprint was determined. A significant change from the most recently stored radio frequency fingerprint can be due to differences in signals from the various cell towers in range of the mobile device 102 that rise above a specified threshold level, such that the differences indicate movement of the mobile device 102 that is likely to have a material bearing on whether redemption of the coupon 118 will be enabled. For example, a significant change from a most recently stored radio frequency fingerprint that was determined at the book store can reflect the amount of movement that indicates a user of the mobile device 102 left the book store.

The mobile device 102 can determine a radio frequency fingerprint for the mobile device 102 based on the user using the mobile device 102. If the user makes a call on the mobile device 102 or activates a web browser on the mobile device 102, the most recently stored radio frequency fingerprint may not have been determined recently. Because determining and storing a radio frequency fingerprint does not require significant time or resources for the mobile device 102 and the network 112, the user using the mobile device 102 may initiate determining and storing a new radio frequency fingerprint.

The mobile device 102 can determine a radio frequency fingerprint for the mobile device 102 based on a location request from the redemption server 116. For example, a t-shirt retailer at a rock concert provides a coupon to mobile devices that are located in a stadium where a rock concert is being performed. The t-shirt retailer targets only those who can afford to purchase the expensive tickets to the rock concert and are therefore more likely to purchase a significant amount of rock concert t-shirts. The t-shirt retailer only wants to redeem the rock concert coupon for t-shirts sold to users of mobile devices that were present during the rock concert. The most recent radio frequency fingerprint may not have been determined recently for many of the mobile devices located in the stadium during the rock concert. The redemption server 116 can transmit a location request that specifies a cell tower proximity. For example, the redemption server 116 can transmit a location request to all of the mobile devices that are communicating through the cell tower #1844, the cell tower closest to the stadium, or all of the cell towers on wheels that are present at the rock concert. All of the mobile devices communicating through the cell tower #1844 may begin to determine a radio frequency fingerprint in background. Due to transmitting a location request, the rock concert coupon is provided exclusively to mobile devices communicating with cell towers at the rock concert, and the t-shirt retailer enables the users of these mobile devices to use the rock concert coupon for on-line purchases. On-line purchases using electronic coupons result in lower overhead for sales, and no loss of sales due to long lines of insufficient local supply.

The mobile device 102 can determine a radio frequency fingerprint based an enablement of the global positioning system, such as when the mobile device 102 is moved from indoors to outdoors. The mobile device 102 can periodically check for global positioning system enablement based on the passage of time. Although the method depicted in FIG. 3 describes the coupon being downloaded before a radio frequency fingerprint is determined, the coupon can be associated with a radio frequency fingerprint that was recently determined and stored.

In box 308, the mobile device 102 associates the coupon 118 with a radio frequency fingerprint. For example, the mobile device 102 associates the coupon 118 for the book store with the radio frequency fingerprint determined at the book store. The mobile device 102 can store the coupon 118, the radio frequency fingerprint, the corresponding time of determining the radio frequency fingerprint, and the unique identifier of the mobile device 102 that determined the radio frequency fingerprint. For example, the mobile device 102 previously stored the data listed in the radio frequency fingerprint data 206 column, the radio frequency fingerprint time 208 column, and the mobile device identifier 210 column for the coffee restaurant coupon 216 row. The mobile device 102 can store such information either in the mobile device 102, in the redemption server 116, or any combination thereof. The amount of information that can be stored for coupons, radio frequency fingerprints, radio frequency fingerprint times, and mobile device identifiers can depend upon the memory available for the mobile device 102 and the redemption server 116.

In box 310, the mobile device 102 determines whether the radio frequency fingerprint matches another radio frequency fingerprint specified for redemption. Alternatively, the redemption server 116 or the point of sale device 120 can determine whether the radio frequency fingerprint matches any other radio frequency fingerprint specified for redemption. The mobile device 102 can determine whether the radio frequency fingerprint matches the radio frequency fingerprint specified for redemption based on one of a duration of time, a user request, and a communication from a point of sale device. For example, the mobile device 102 responds to a communication from the point of sale device 120 in the book store by determining whether the radio frequency fingerprint associated with the coupon 118 matches another radio frequency fingerprint specified for redemption by the book store. Alternatively, the user of the mobile device 102 can enter input into the user interface to determine if a book store coupon is valid for redemption at the book store.

The book store can specify a radio frequency fingerprint associated with the location of the book store. The book store can also specify a number of other radio frequency fingerprint associated with the locations of other book stores that are members of the same national business that would accept the coupon 118. Furthermore, the book store can specify a radio frequency fingerprint associated with a promotional location, such as a hotel where the book store hosted a book signing event for a famous author and where the book store made coupons available for downloading.

If the mobile device 102 determines that the radio frequency fingerprint matches another radio frequency fingerprint specified for redemption, the method continues to box 312. If the mobile device 102 determines that the radio frequency fingerprint does not match another radio frequency fingerprint specified for redemption, the method proceeds to box 314. The mobile device 102 determines that the radio frequency fingerprint matches another radio frequency fingerprint specified for redemption if a degree of confidence score based on a comparison of the radio frequency fingerprint and another radio frequency fingerprint specified for redemption exceeds a threshold score.

The mobile device 102 uses a degree of confidence score to determine matches because the signal strength from cell towers is highly variable due to the amount of communication traffic and the time of the day, such that the mobile device 102 can determine slightly different radio frequency fingerprints over time even when the mobile device 102 is completely stationary. The cell tower closest to the mobile device 102 may become very busy, and contract the cell tower signal strength accordingly. The radio frequency fingerprint for the mobile device 102 can include signals from a primary cell tower, which can indicate the longitude and the latitude of the primary cell tower, and signals from additional cell towers. Furthermore, the radio frequency fingerprint can include multiple frequencies for each sector for each cell tower that is within range of the mobile device 102.

Therefore, the mobile device 102 executes an algorithm to produce a confidence score based on the likelihood that the radio frequency fingerprint is determined from the same location as any radio frequency fingerprint that is specified for redemption. For example, if the radio frequency fingerprint included signals from four cell towers, and the radio frequency fingerprints specified for redemption includes signals from the same four cell towers and one additional cell tower, the algorithm can set the degree of confidence at 90%. If the mobile device 102 compares the 90% degree of confidence to a specified threshold score of 80%, the mobile device 102 can determine that the radio frequency fingerprint matches a radio frequency fingerprint specified for redemption. The threshold score can be set variably, such that the matching of only one common cell tower is sufficient, and can be based on a significant difference between the radio frequency fingerprint and the radio frequency fingerprints specified for redemption.

In box 312, the mobile device 102 enables redemption of a coupon. For example, the mobile device 102 enables redemption of the coupon 118 for a discount on a book purchase from the point of sale device 120 at the book store. Additionally, the mobile device 102 can determine if the current radio frequency fingerprint matches the radio frequency fingerprint specified for redemption of a number of coupons, and display the matching coupons on a user interface. For example, when the user of the mobile device 102 enters a shopping mall, the user interface can display every downloaded coupon that can be redeemed at the shopping mall.

In box 314, the mobile device 102 disables redemption of a coupon. For example, the mobile device 102 disables redemption of the coupon 118 because the radio frequency fingerprint associated with the coupon 118 does not match any radio frequency fingerprint specified for redemption by the book store. The absence of a match can be because the book store is a local retail store in a national business that does not redeem coupons issued by the business' retail stores that are at other locations. The absence of the match can also be because the coupon 118 presented for redemption is fraudulent.

Periodically, the mobile device 102 can examine the coupon 118 to determine if an expiration date for the coupon 118 indicates that the coupon 118 has expired. If the expiration date for the coupon 118 indicates that the coupon 118 has expired, the mobile device 102 can purge the coupon 118 from storage on the mobile device 102, the redemption server 116, or any combination thereof.

In some embodiments of the present disclosure, the mobile device 102 can execute a location fix technology to generate a location fix and use the location fix, instead of the radio frequency fingerprint, for coupon validation as described in FIG. 3. For example, the mobile device 102 can execute a global positioning system technology, an advanced forward link trilateration technology, or a hybrid location fix technology to determine the location of the mobile device 102.

Global positioning system satellites transmit signals that are received by the mobile device 102. The mobile device 102 triangulates its position based on the different signals received from different satellites. The location accuracy is environment driven and dependant on the type of equipment used. The global positioning system technology is owned and operated by the U.S. Department of Defense, but is available for general use around the world. The global positioning system technology requires a direct line of sight between the mobile device 102 and four or more satellites to fix the location of the mobile device, such as when the mobile device is outdoors. Although the global positioning system technology provides high accuracy location fixes, this technology often cannot provide location fixes for mobile devices that are indoors. Because of the time and the battery power required to measure signals from multiple satellites and to triangulate the location fix, the mobile device 102 executes the global positioning system technology in background infrequently for periodic determinations of location fixes.

Furthermore, the mobile device 102 can use advanced forward link trilateration technology to determine its position based on the different radio frequency signals received from different cell towers, such as the first cell tower 108 and the second cell tower 110. Each serving cell tower broadcasts a system parameters information message to the mobile device 102. This message includes the longitude and the latitude of the serving cell tower. The radius covered by serving cell towers vary greatly, from hundreds of meters in dense urban areas to 20 miles or more in rural environments.

The advanced forward link trilateration technology fixes the location of the mobile device 102 based on measurements taken of time and distance signals from nearby cell towers. The mobile device 102 reports the time and distance measurements to the network 112, then the network 112 triangulates a location fix of the mobile device 102, and reports the location fix back to mobile device 102. In general, more than three surrounding cell towers are required to triangulate an optimal location fix. Because of the time required to measure signals from multiple cell towers, to report the measurements to the network 112, to triangulate the location fix, and to report the location fix back to the mobile device 102, the advanced forward link trilateration technology requires significant amounts of both time and resources from the mobile device 102 and the network 112. Therefore, although the advanced forward link trilateration technology determines high accuracy location fixes, the mobile device 102 executes the advanced forward link trilateration technology in background infrequently for periodic determinations of location fixes.

The mobile device 102 can use a hybrid technology to fix the location of the mobile device 102 based on a combination of other location fix technologies. For example, if the mobile device 102 is indoors, but close to a window, the global positioning system technology in combination with a cell tower location technology can calculate the location fix for the mobile device 102. When the mobile device 102 is indoors, the mobile device 102 may receive signals from an insufficient number of satellites to triangulate the position of the mobile device 102. However, the hybrid technology can combine the signals from the insufficient number of satellites with the cell tower location identified by the channel length modulation (CLM) to calculate a hybrid location fix for the mobile device 102.

Figure 4:
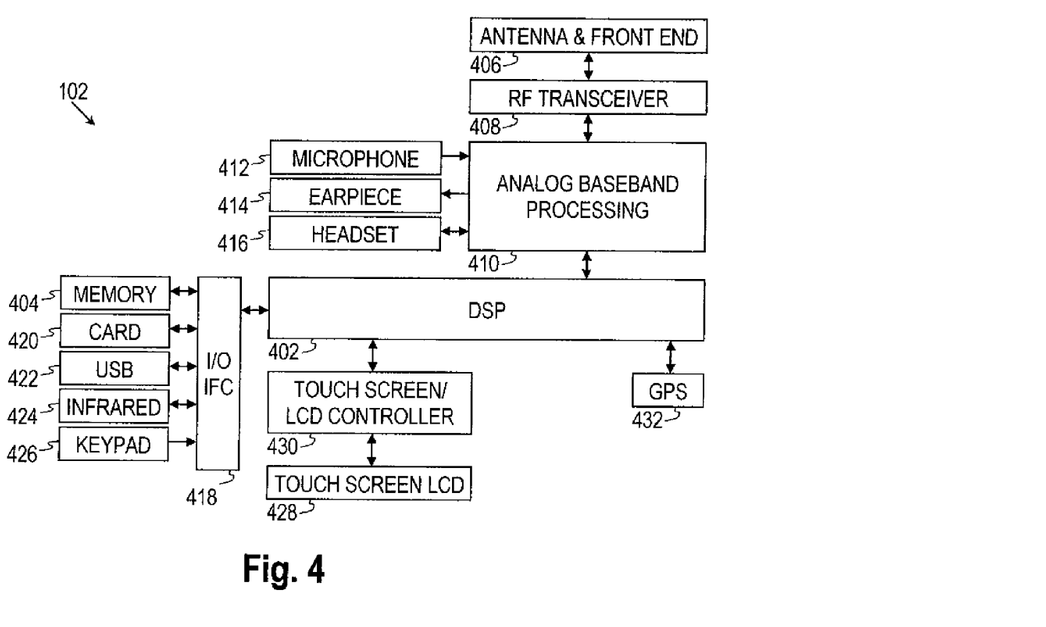
FIG. 4 shows a block diagram of an illustrative mobile device.

FIG. 4 shows a block diagram of the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a memory card 420, a universal serial bus (USB) port 422, an infrared port 424, a keypad 426, a liquid crystal display (LCD) with a touch sensitive surface 428, a touch screen/LCD controller 430, and a global positioning system (GPS) sensor 432.

The DSP 402 or some other form of controller or central processing unit operates to control the various components of the mobile device 102 in accordance with embedded software or firmware stored in the memory 404. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 converts between wireless signals and electrical signals, enabling the mobile device 102 to send and receive information from a cellular network or some other available wireless communications network. The RF transceiver 408 provides frequency shifting, e.g., converting received RF signals to baseband and converting baseband transmit signals to RF. The received RF signals can be from one cell tower, such as the first cell tower 108, or from multiple cell towers, such as the first cell tower 108 and the second cell tower 110. The analog baseband processing unit 410 provides channel equalization and signal demodulation to extract information from received signals, modulates information to create transmit signals, and provides analog filtering for audio signals. To that end, the analog baseband processing unit 410 includes ports for connecting to the built-in microphone 412 and the earpiece speaker 414 that enable the mobile device 102 to be used as a cell phone.

The DSP 402 can send and receive digital communications with a wireless network via the analog baseband processing unit 410. The input/output interface 418 interconnects the DSP 402 and various memories and interfaces. The memory 404 and the removable memory card 420 may provide software and data to configure the operation of the DSP 402. The infrared port 424 and other optional ports such as a Bluetooth interface or an IEEE 802.11 compliant wireless interface enable the mobile device 102 to communicate wirelessly with other nearby mobile devices and/or wireless base stations. In some contemplated systems, the mobile device 102 is able to wirelessly exchange information at a point-of-sale when placed near a suitable transceiver.

The keypad 426 couples to the DSP 402 via the I/O interface 418 to provide one mechanism for the user to make selections, enter information, and otherwise provide input to the mobile device 102. Another input mechanism may be the touch screen display 428, which may also display text and/or graphics to the user. The display controller 430 couples the DSP 402 to the touch screen display 428.

The GPS sensor 432 is coupled to the DSP 402 to decode global positioning system signals, thereby providing at least one technology for the mobile device 102 to determine its location. Various other peripherals may also be included to provide additional functions, e.g., radio and television reception.

Figure 5:
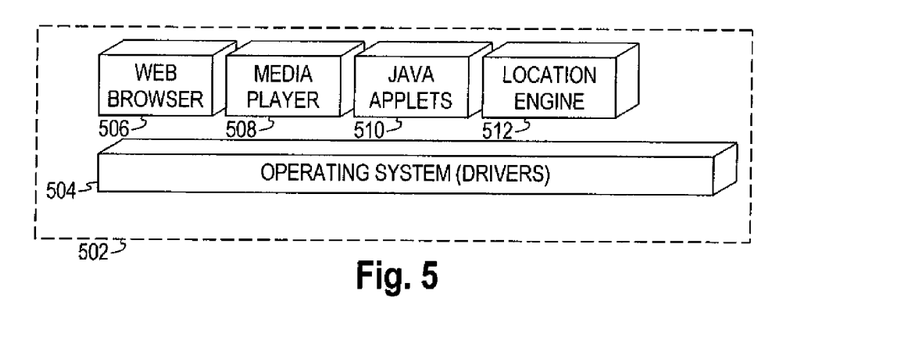
FIG. 5 shows a block diagram of an illustrative software configuration for a mobile device.

FIG. 5 illustrates a software environment 502 that may be implemented by the DSP 402. The DSP 402 executes operating system software 504 that provides a platform from which the rest of the software operates. The operating system software 504 provides drivers for the mobile device hardware to make standardized interfaces available to application software. The operating system software 504 may transfer control between applications running on the mobile device 102. Also shown in FIG. 5 are a web browser 506 application, a media player 508, application JAVA applets 510, and a location engine 512 application. The web browser 506 application configures the mobile device 102 to operate as a web browser, allowing the user to enter information into forms and select links to retrieve and view web pages, including content from the server 114. The media player 508 application configures the mobile device to retrieve and play audio or audiovisual media on its own output components. The JAVA applets 510 may configure the mobile device 102 to provide games, utilities, and other functionality on the mobile device 102. These are further examples of content that may be provided by the server 114.

The location engine 512 application can determine the radio frequency for the mobile device 102 and associate the radio frequency fingerprint with the coupon 118. The location engine 512 application can also execute a location fix technology for the mobile device 102. Additionally, the location engine 512 application can enable redemption of the coupon 118 or disable redemption of the coupon 118. The location engine 512 application can also execute location fix technologies to determine location fixes for the mobile device 102, and store the location fixes on the mobile device 102. The location engine 512 application can also receive location requests for stored location fixes for the mobile device 102, retrieve the location fixes on the mobile device 102, and send the location fixes to the server 114, the redemption server 116, or the point of sale device 120.

Figure 6:
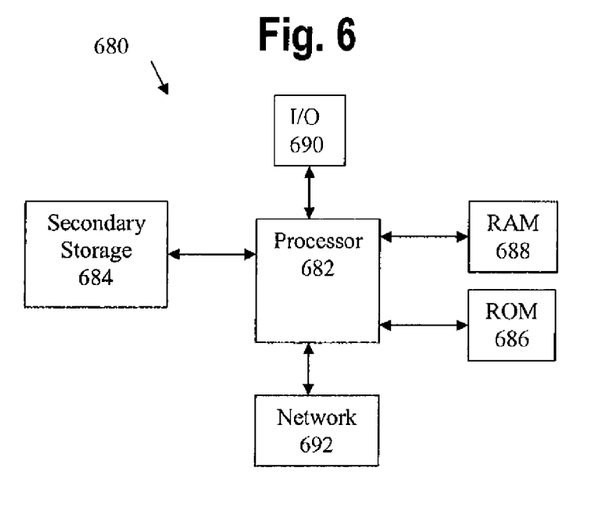
FIG. 6 illustrates an exemplary general purpose computer system suitable for implementing the several embodiments of the disclosure closure.

The system described above may be implemented on any general-purpose computer with sufficient processing power, memory resources, and network throughput capability to handle the necessary workload placed upon it. FIG. 6 illustrates a typical, general-purpose computer system, such as the server 114, suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for coupon validation, comprising:
    downloading a coupon to a mobile device;
    determining with a location engine stored in a non-transitory computer readable media and executed by a processor on the mobile device a download radio frequency fingerprint comprising cell tower data and cell sector data at approximately where the coupon was downloaded to the mobile device;
    associating the coupon downloaded to the mobile device with the download radio frequency fingerprint;
    determining whether the associated download radio frequency fingerprint matches at least one valid download radio frequency fingerprint for the coupon, wherein the at least one valid download radio frequency fingerprint for the coupon comprises a radio frequency fingerprint of a valid location for downloading the coupon; and
    enabling redemption of the coupon in response to a determination that the download radio frequency fingerprint matches the at least one valid download radio frequency fingerprint.

2. The computer implemented method of claim 1, further comprising:
    determining whether a radio frequency fingerprint for the mobile device indicates the mobile device is in a location for coupon downloading; and
    downloading the coupon in response to a determination that the radio frequency fingerprint for the mobile device indicates that the mobile device is in the location for coupon downloading.

3. The computer implemented method of claim 1, further comprising:
    disabling redemption of the coupon in response to a determination that the download radio frequency fingerprint does not match the at least one valid download radio frequency fingerprint specified for redemption.

4. The computer implemented method of claim 1, wherein the download radio frequency fingerprint comprises a time associated with when the download radio frequency fingerprint was determined.

5. The computer implemented method of claim 1, wherein the download radio frequency fingerprint comprises an identifier for the mobile device.

6. The computer implemented method of claim 2, wherein the location for coupon downloading is associated with the download radio frequency fingerprint for the mobile device.

7. The computer implemented method of claim 2, wherein the location for coupon downloading is not associated with the download radio frequency fingerprint for the mobile device.

8. The computer implemented method of claim 1, further comprising:
    determining whether a current radio frequency fingerprint matches the download radio frequency fingerprint associated with the coupon downloaded to the mobile device; and
    displaying the coupon on a user interface in response to determining that the current radio frequency fingerprint matches the download radio frequency fingerprint.

9. The computer implemented method of claim 1, further comprising:
    Downloading a second coupon on a computer and transferring the second coupon to the mobile device.

10. The computer implemented method of claim 1, wherein the download radio frequency fingerprint further comprises at least one of cell tower signal amplitude, cell tower signal phase, cell sector frequencies, and pseudo noise phase measurement data.

11. The computer implemented method of claim 1 wherein determining whether the download radio frequency fingerprint matches the at least one valid download radio frequency fingerprint is based on one of a duration of time, a user request, and a communication from a point of sale device.

12. The computer implemented method of claim 1 wherein the at least one valid download radio frequency fingerprint is associated with at least one of a business location of a business that issued the coupon and an other location associated with the business that issued the coupon.

13. The computer implemented method of claim 1, wherein the download radio frequency fingerprint matches the valid download radio frequency fingerprint based on both the download radio frequency fingerprint and the valid download radio frequency fingerprint having at least one common cell tower.

14. The computer implemented method of claim 1, further comprising:
    purging the coupon if a time for using the coupon is expired.

15. The computer implemented method of claim 1 wherein determining whether the download radio frequency fingerprint matches the at least one valid download radio frequency fingerprint is a determination made by a point of sale device.

16. The computer implemented method of claim 1 wherein determining whether the download radio frequency fingerprint matches the at least one valid download radio frequency fingerprint is a determination made via a communication server associated with the mobile device.

17. A system for coupon validation, comprising:
    a mobile device configured to download a coupon; and
    a location engine stored in a non-transitory computer readable medium and executable by a processor on the mobile device to determine a download radio frequency fingerprint comprising cell tower data and cell sector data for a location of the mobile device approximately where the coupon was downloaded, the location engine associating the coupon downloaded to the mobile device with the download radio frequency fingerprint,
    a non-transitory computer readable storage on the mobile device configured to store the coupon and the associated download radio frequency fingerprint;
    wherein the mobile device is programmed to determine whether the associated download radio frequency fingerprint matches at least one valid download radio frequency fingerprint specified for redemption and the mobile device is further programmed to promote redemption of the coupon in response to a determination that the download radio frequency fingerprint matches the at least one valid download radio frequency fingerprint specified for redemption.

18. The system of claim 17, further comprising a server in communication with the mobile device, wherein the location engine is further operable to store the coupon and the download radio frequency fingerprint on the server.

19. A computer implemented method for coupon validation, comprising:
- receiving at a first mobile device a coupon and a download radio frequency fingerprint from a second mobile device, wherein the download radio frequency fingerprint comprises cell tower data and cell sector data at approximately where the coupon was downloaded to the second mobile device;
- storing the coupon and the download radio frequency fingerprint on a non-transitory computer readable media on the first mobile device;
- determining, with a processor, whether the download radio frequency fingerprint matches at least one valid download radio frequency fingerprint specified for redemption; and
- enabling redemption of the coupon in response to a determination that the download radio frequency fingerprint matches the at least one valid download radio frequency fingerprint specified for redemption.

20. The computer implemented method of claim 19, further comprising:
- determining with a processor on the first mobile device another radio frequency fingerprint comprising cell tower data and cell sector data at approximately where the coupon was received by the first mobile device from the second mobile device; and
- associating the coupon with the other radio frequency fingerprint.

21. The computer implemented method of claim 1, wherein the determining whether the download radio frequency fingerprint matches the at least one valid download radio frequency fingerprint is performed by one of the mobile device, a redemption server, and a point of sale device.

22. The computer implemented method of claim 1, wherein the coupon is issued by a business and the at least one valid download radio frequency fingerprint is specified by the business as a radio frequency fingerprint associated with where the business made the coupon available for downloading.

23. The computer implemented method of claim 1 wherein determining whether the download radio frequency fingerprint matches the at least one valid download radio frequency fingerprint is based on whether a degree of confidence score calculated based on a comparison of the download radio frequency fingerprint and the at least one valid download radio frequency fingerprint exceeds a threshold score.

* * * * *